United States Patent Office 2,817,680
Patented Dec. 24, 1957

2,817,680

NEW COMPOSITION OF MATTER

Teh-Fu Yen, Akron, Ohio, assignor to The Goodyear Tire & Rubber Company, Akron, Ohio, a corporation of Ohio No Drawing. Application June 12, 1956
Serial No. 590,820

1 Claim. (Cl. 260—515)

This invention relates to the new composition of matter 4-chlorosulfonyl-1-naphthylacetic acid. A method for the preparation of this compound is shown below, in which parts are shown by weight.

*Example*

To 582.5 parts of chlorosulfonic acid, 186 parts of α-naphthaleneacetic acid was slowly added at 0–5° C. with stirring. As the reaction proceeded hydrogen chloride gas was evolved. After 6 hours the reaction mixture was allowed to warm to room temperature and stirring was continued for an additional 12 hours. The reaction mixture was gently heated to 40–45° C. for 4 hours. Ice was added to the reaction mixture, and a yellow precipitate was collected. The precipitate was recrystallized twice from benzene and collected as white needles having a melting point of 174–175° C. Analysis showed the chlorine and sulfur contents of this compound to be 12.52% and 11.31% by weight respectively. Theoretical amounts of these constituents in 4-chlorosulfonyl-1-naphthylacetic acid are 12.45% and 11.26% by weight respectively.

This compound may be used as an intermediate in the preparation of a disulfide such as, bis-(4-carboxymethyl-1-naphthyl) disulfide, described in copending application No. 590,823, filed June 12, 1956.

While certain representative embodiments and details have been shown for the purpose of illustrating the invention, it will be apparent to those skilled in this art that various changes and modifications may be made therein without departing from the spirit or scope of the invention.

What is claimed is:

As a composition of matter, 4-chlorosulfonyl-1-naphthylacetic acid defined by the formula:

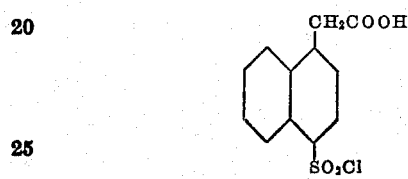

References Cited in the file of this patent

UNITED STATES PATENTS 2,174,856    Johnson _____ Oct. 3, 1939